No. 717,408. Patented Dec. 30, 1902.
J. JACOBSEN.
FISH CLEANER AND SCALER.
(Application filed Nov. 25, 1901.)

(No Model.)

WITNESSES:
D. E. Carlsen.
E. C. Carlsen.

INVENTOR:
John Jacobsen
BY his ATTORNEY
A. M. Carlsen.

UNITED STATES PATENT OFFICE.

JOHN JACOBSEN, OF LETHBRIDGE, CANADA.

FISH CLEANER AND SCALER.

SPECIFICATION forming part of Letters Patent No. 717,408, dated December 30, 1902.

Application filed November 25, 1901. Serial No. 83,564. (No model.)

*To all whom it may concern:*

Be it known that I, JOHN JACOBSEN, a subject of the King of Denmark, residing at Lethbridge, in the southern district of Alberta, Canada, have invented certain new and useful Improvements in Fish Cleaners and Scalers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in devices for cleaning and scaling fish; and the object of the invention is to provide a convenient combined opening, cleaning, and scaling device for various sizes of fish. This object I attain by the novel construction and arrangement of parts illustrated in the accompanying drawings, in which—

Figure 1:
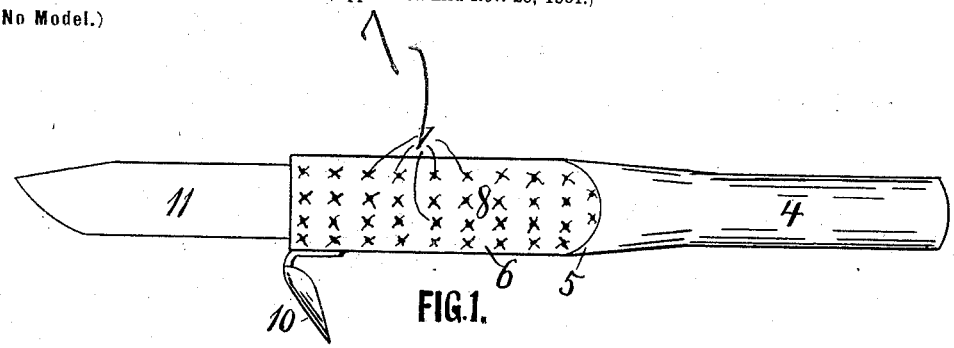
Figure 2:
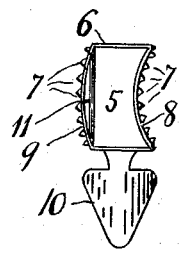
Figure 3:
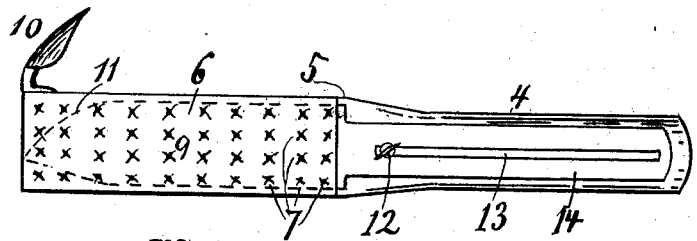

Figure 1 is a side view of my device with the knife-blade extended in position for use. Fig. 2 is a front end view of Fig. 1, and Fig. 3 is Fig. 1 inverted and with the knife-blade retracted upon the handle.

Referring to the drawings by reference-numerals, 4 is the handle of the device. About the front enlargement 5 of the handle I secure the shell 6, which is provided with scaling teeth or burs 7 upon a concave surface 8 for scaling small fish and a convex surface 9 for scaling big fish. At the front end of the shell 6 or the handle on which it is secured I provide the spoon-shaped hook or scraper 10, by which the intestines and other inside matter is removed from the fish after it is opened with the knife-blade 11, which is slidingly inserted between the convex portion of the shell and the handle 4, upon which it is further held slidably by the set-screw 12, secured in the handle within the guiding-slot 13 of the rear extension 14 of the blade.

From the above description it will be seen that I provide in a single implement a combined knife 11, cleaner 10, and scale-removers of various curvatures and that said knife may be withdrawn into the device when not in use.

What I claim, and desire to secure by Letters Patent, is—

1. In a fish-cleaning device, the combination with a suitable handle, of a toothed scale-removing shell secured at one end thereof and having a convex and concave toothed surface.

2. In a fish-cleaner, the combination with a suitable handle, of a scale-removing toothed shell secured thereon and a retractable knife-blade slidingly inserted between the shell and the handle and having a slot and a screw secured in the handle within the slot to limit the sliding movement of the knife, and to hold it in various positions.

In testimony whereof I affix my signature in presence of two witnesses.

JOHN JACOBSEN.

Witnesses:
T. G. STOCKTON,
JOHN E. T. MCKNIGHT.